US007258304B2

(12) United States Patent
Miener

(10) Patent No.: US 7,258,304 B2
(45) Date of Patent: Aug. 21, 2007

(54) CUSHIONED GROUNDING CLAMP

(75) Inventor: Steven J. Miener, Florissant, MO (US)

(73) Assignee: The Boeing Company, Chicago, IL (US)

( * ) Notice: Subject to any disclaimer, the term of this patent is extended or adjusted under 35 U.S.C. 154(b) by 384 days.

(21) Appl. No.: 10/808,850

(22) Filed: Mar. 25, 2004

(65) Prior Publication Data

US 2005/0224653 A1 Oct. 13, 2005

(51) Int. Cl.
*H01R 4/38* (2006.01)
*B64C 1/00* (2006.01)

(52) U.S. Cl. .................... 244/129.1; 248/62; 248/74.3; 439/799; 439/800; 439/574; 439/445; 439/384

(58) Field of Classification Search .................. 248/62, 248/63, 74.3; 244/129.1, 131; 307/100; 439/34, 382, 384, 445, 574, 775, 799, 800
See application file for complete search history.

(56) References Cited

U.S. PATENT DOCUMENTS

| | | | | |
|---|---|---|---|---|
| 1,616,847 A | | 2/1927 | Feige | |
| 1,809,009 A | | 6/1931 | Andre | |
| 2,554,169 A | | 5/1951 | Bergan | |
| 3,564,116 A | | 2/1971 | Masterson et al. | |
| 3,609,631 A | | 9/1971 | Looney et al. | |
| 4,591,229 A | | 5/1986 | Sachs | |
| 4,609,171 A | * | 9/1986 | Matsui | 248/74.3 |
| 4,626,051 A | | 12/1986 | Franks, Jr. | |
| 4,664,469 A | | 5/1987 | Sachs | |
| 4,780,096 A | | 10/1988 | Franks, Jr. | |
| 4,912,809 A | | 4/1990 | Scheuer | |
| 4,973,259 A | | 11/1990 | Sachs | |
| 5,131,856 A | | 7/1992 | Auclair | |
| 5,314,343 A | | 5/1994 | Englander | |
| 5,616,036 A | | 4/1997 | Polidori | |
| 5,850,056 A | * | 12/1998 | Harwath | 174/40 CC |
| 5,929,383 A | | 7/1999 | Marik et al. | |
| 6,398,596 B1 | | 6/2002 | Malin | |
| 6,486,402 B2 | | 11/2002 | Harger et al. | |
| 6,735,070 B2 | * | 5/2004 | Antila | 361/220 |
| 6,943,299 B1 | * | 9/2005 | Daume | 174/78 |

* cited by examiner

*Primary Examiner*—J. Woodrow Eldred
(74) *Attorney, Agent, or Firm*—Lee & Hayes, PLLC

(57) ABSTRACT

The present invention is directed toward clamping apparatus and methods for holding an item to an electrically conductive structure. In one embodiment, the clamp includes a strap, a fastener, a cushion, and a conductive material. The strap provides the structural strength for holding the item. The fastener is coupled to the strap for securing the strap to the structure. The cushion is disposed within the strap to at least partially isolate the item from shock and vibration transmitted through the strap. The conductive material is held by the cushioning material at least at a portion of the interior surface of the cushioning material. The conductive material is electrically coupled to the strap.

21 Claims, 3 Drawing Sheets

CUSHIONED GROUNDING CLAMP

FIELD OF THE INVENTION

The present invention disclosure relates to clamps for securing tubes or ducts to a larger structure, and more specifically, to clamps that electrically ground the item held to the larger structure.

BACKGROUND OF THE INVENTION

Objects requiring electrical grounding in their installed application are countless. Electrical grounding is commonplace in vehicles for traversing air, land, or water. For example, metallic tubes and ducts are typically installed in aircraft with P-clamps or D-clamps that would typically include a cushioning material such as rubber to dampen vibration such that a secure trouble-free assembly is formed. However, such vibration dampening materials that either stop vibration or conform to securely hold the tube, pipe or other object, are typically electrical insulators. Thus, the pipe, tube, or other object being held must be separately grounded. Similarly, on the aircraft, metallic tubes and ducts (e.g. oxygen, ECS, fuel, and hydraulic lines) that are over three inches in length must be grounded to aircraft structure to prevent static electricity build-up on the lines. Such grounding is currently carried out with bonding hardware consisting of approximately 10 parts. A conductive metallic loop-type grounding clamp is used with a grounding jumper, bolts, washers, and various nuts. All of these parts increase the complexity and part count as well as the difficulty of assembly of the aircraft. Similar problems are likewise encountered in various industries where grounding of the clamped part is required. Thus, a need exists to eliminate separate grounding hardware and incorporate this capability into a structural support clamp.

SUMMARY OF THE INVENTION

The present invention is directed toward clamping apparatus and methods for holding an item to an electrically conductive structure. In one embodiment, a clamp includes a strap, a fastener, a cushion, and a conductive material. The strap provides the structural strength for holding the item, is electrically conductive, and provides an electrical grounding path to structure. The fastener is coupled to the strap for securing the strap to the structure. The cushion is disposed within the strap to at least partially isolate the held item from shock and vibration transmitted through the strap. The conductive material is held by at least at a portion of the interior surface of the cushioning material. The conductive material is electrically coupled to the strap.

In another embodiment, the cushion is constructed with an electrically conductive material. The conductive material is electrically coupled to the strap. In this embodiment, the strap is preferably metal and the cushioning material includes rubber.

In another embodiment, the cushion includes an interior surface. The conductive material includes a metallic strip coupled to the interior surface of the cushion. The strap includes a securement portion configured to receive the fastener with the metallic strip being electrically coupled thereto.

In an alternate embodiment of the invention, the conductive material is made up of metallic stitching within the cushion. In this embodiment, at least a portion of the stitching is exposed to the interior surface of the cushion. The stitching is also exposed to the conductive strap, forming a conductive path thereto. Alternatively, the conductive material may be composed of embedded thin wire within the cushion.

The strap may alternatively be a "P" shape or "D" shape. In the D-shape embodiment, the strap includes two parts coupled together to encircle the item. In the D-shape configuration, the cushioned material is secured to both parts. Alternatively, a "U" shape construction may be utilized with a single part.

Alternatively, the invention may be described as a holder for holding an electrically conductive object to a structure. In one embodiment, the holder includes a cushioned material, and an electrically conductive material. The cushioned material is arranged to contact the object on one side thereof. The electrically conductive material is coupled to the cushioned material and has at least a portion thereof on the side of the cushion for contact with the object. The electrically conductive material is arranged for electrical conductivity to the structure. Preferably, the holder is in the form of a bracket to which the cushioned material is secured. The bracket provides structure to hold the object in place. A fastener is coupled to the bracket and secured to the structure. The bracket is electrically coupled to the conductive material to complete the grounding to the structure from the object. In the preferred form, the bracket is in the form of a clamp with the cushioned material being disposed within the clamp such that the cushioned material is at least partially exposed between the object and the clamp.

A method of securing an item to an electrically conductive structure is also part of the present invention. In one embodiment, a method includes coupling a conductive material to a cushioned material, securing the cushioned material to an elongated strap, partially encircling the item to be secured by the elongated strap, and fastening the elongated strap to the structure. At least a portion of the strap is conductive with the cushioned material being coupled to the conductive portion. The cushioned material is placed between the elongated strap and the item with the conductive material contacting the item. The elongated strap is fastened to the structure with a fastener, the conductive portion of the strap is coupled to structure to complete the ground.

The coupling a conductive material to a cushioned material may include securing a metallic strap to an inner surface of the cushioned material. Alternatively, a metallic material may be stitched, woven, or otherwise formed into the cushioned material, or the cushioned material itself may be conductive.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention relates to clamping apparatus and methods for holding objects, and more specifically, to an integrated grounding system with a clamp that includes a cushioning material. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without all of the details described in the following description.

Figure 1:
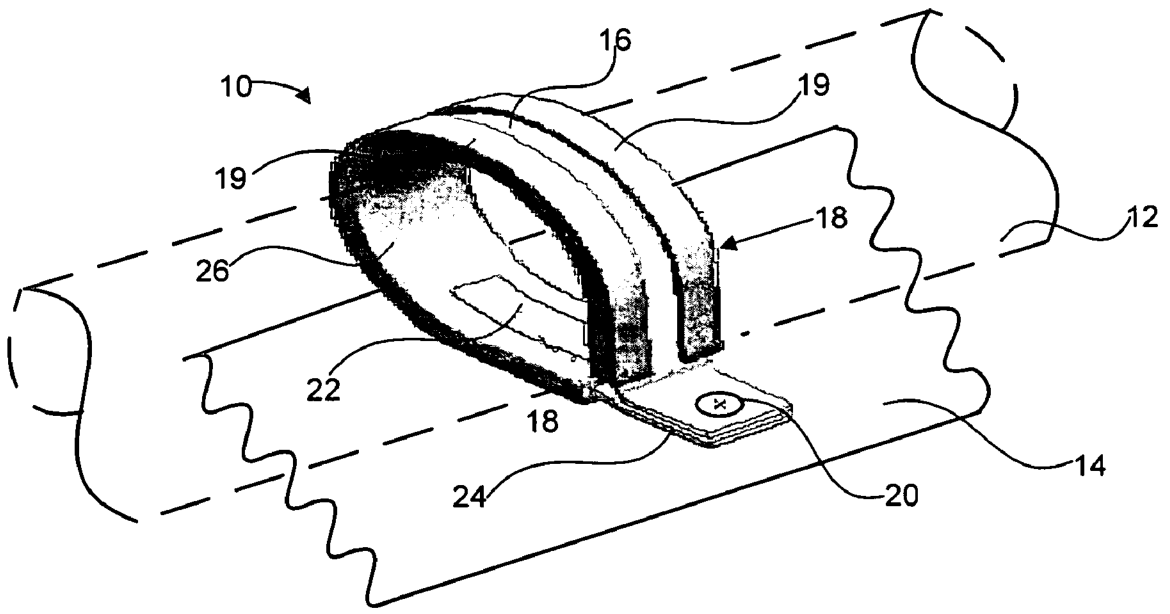
FIG. 1 is a perspective view of a clamp in accordance with an embodiment of the present invention shown holding a tube to a mount structure.
Figure 2A:
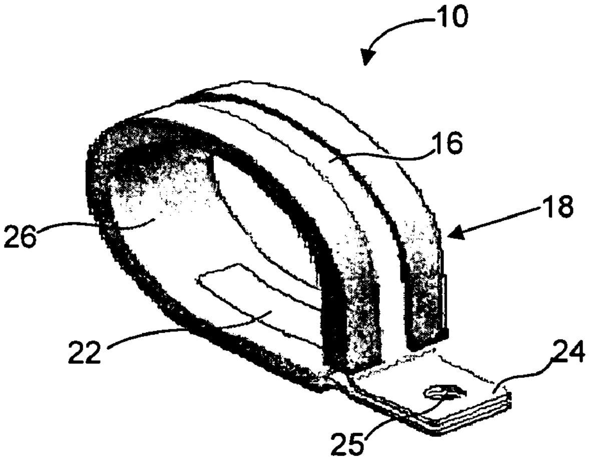
FIG. 2*a* is an isometric view of a "P" shape embodiment of the present invention with a metallic strip for conductive grounding.

FIG. 1 is a perspective view of a cushioned grounding clamp 10 of the present invention shown holding a tube 12 to a mount structure 14. FIG. 2*a* is an isometric view of the "P" shaped clamp 10 of FIG. 1. With reference to FIG. 1, the mount structure 14 may be any structural element to which tube 12 is to be secured, such as a structural beam in an aircraft fuselage. Tube 12 is a tube, pipe, or duct for containing gases or fluid materials that are used within the aircraft, such as, for example, air, oxygen, fuel, or hydraulic fluid. Tube 12 is at least partially electrically conductive such that it must be grounded to the aircraft structure to prevent static electricity build-up. As will be described in more detail below, the clamp 10 of the present invention provides a grounding assembly to eliminate several parts typically used for grounding the metallic tube 12.

Clamp 10 includes a strap 16 forming the basic structural component of clamp 10. Strap 16 is preferably constructed of metal and is formed into a clamp shape, such as a "P" shape as shown in FIGS. 1 and 2*a*. Thus, strap 16 is electrically conductive in the preferred embodiment. A cushion 18 is disposed around the interior of strap 16. Cushion 18 may also have wings 19 that extend upwardly from the main interior portion of cushion 18 to partially surround the sides and outer face of strap 16. Strap 16 is also formed with mounting flanges at the end thereof that come together to be secured to the mount structure with a fastener 20. To this end, a hole, (not shown in FIG. 1), is provided within mounting flange 24. Fastener 20 may include a machine screw, bolt, or other suitable fastening device to fasten clamp 10 to mount structure 14.

In this embodiment, a metallic strip 22 is bonded or retained in another manner to an interior surface 26 of cushion 18. Metallic strip 22 is formed of a conductive metal, and in one embodiment, may be formed from a thin stripping material that is glued or otherwise secured to the interior surface 26 of cushion 18. Metallic strip 22 extends from its exposed position to a position where it contacts strap 16. Metallic strip 22 may extend partially or completely between mounting frames 24. Metallic strip 22 may be tack welded or otherwise secured to strap 16. Strap 16, being conductive, can transmit electricity to mount structure 14 for grounding. For example, metallic strip 22, being a thin strip of soft metal or other conductive material, may simply extend between the ends of mounting flange 24 at the location of the hole in mounting flange 24 for fastener 20. Fastener 20 may be inserted therethrough to ensure metallic strip 22 is retained and makes positive electrical contact to strap 16.

Figure 2B:
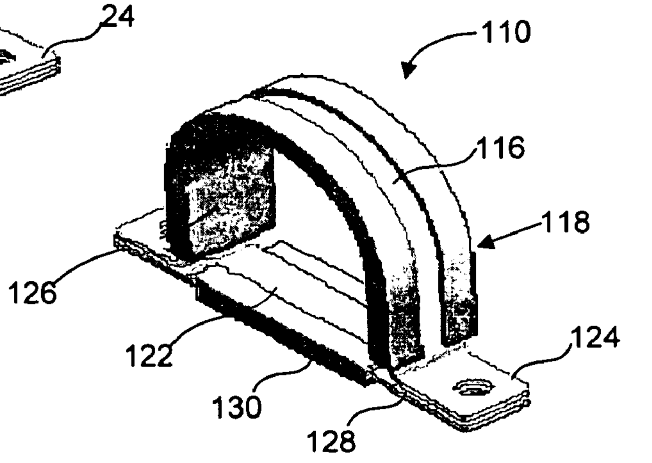
FIG. 2*b* is an isometric view of a "D" shape embodiment with a metallic strip.

FIG. 2*b* is an isometric view of a clamp 110 having a thin metallic strip 122 in accordance with another embodiment of the present invention, but with the clamp 110 having a "D" shape configuration. In this embodiment, a base strap 128 and a base cushion 130 are provided. The main strap 116 forms a "U" shape with the base strap 128 continuing the loop to form an overall "D" shape. Because two strap portions are provided, a cushioning material may also be provided in two sections, an upper cushion 118 and a base cushion 130.

Note that throughout the discussion of FIGS. 2 through 4, the 10s and 1s digits in the numbered elements are used for similar features from one figure to the next. Thus, for example, main strap 116 of FIG. 2*b* is similar to strap 16 of FIG. 2*a*.

In the embodiment of FIG. 2*b*, metallic strip 122 extends over the interior surface of base cushion 130. The end of metallic strip 122 extends such that it contacts mounting flange 124. Contact may be provided at one or both sides of base strap 128. Alternatively, metallic strip 22 may reside on interior surface of upper cushion 118.

Figure 3A:
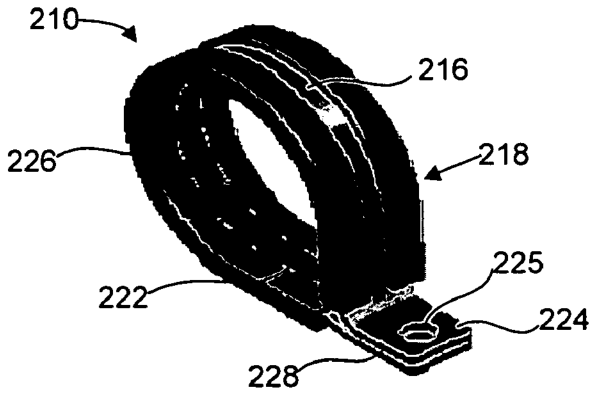
FIGS. 3*a* and 3*b* illustrate "P" shape and "D" shape embodiments in isometric views with metallic stitchings.
Figure 3B:
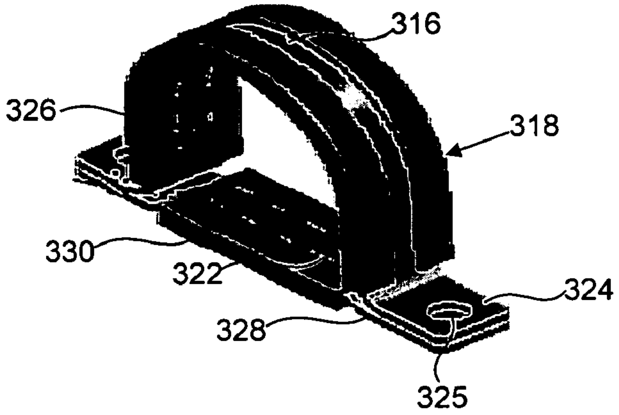

FIGS. 3*a*, 3*b*, 4*a*, and 4*b* illustrate alternative embodiments of "P" shape and "D" shape clamps, but with different conductive materials secured to the cushion. More specifically, in FIGS. 3*a* and 3*b*, metallic stitching 222, 322 is used to extend through and be exposed at least partially on the interior surfaces 226, 326 of cushions 218 (FIG. 3*a*) and cushions 318, 330 (FIG. 3*b*). The metallic stitching 222, 322 contacts strap 216, 316, and 328.

Figure 4A:
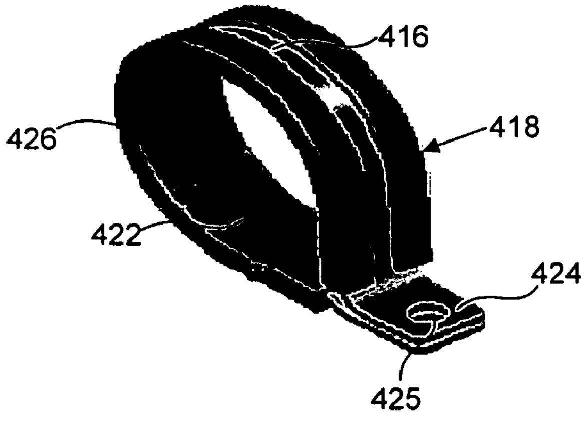
FIGS. 4*a* and 4*b* are isometric views of "P" shape and "D" shape embodiments with conductive cushioned material.
Figure 4B:
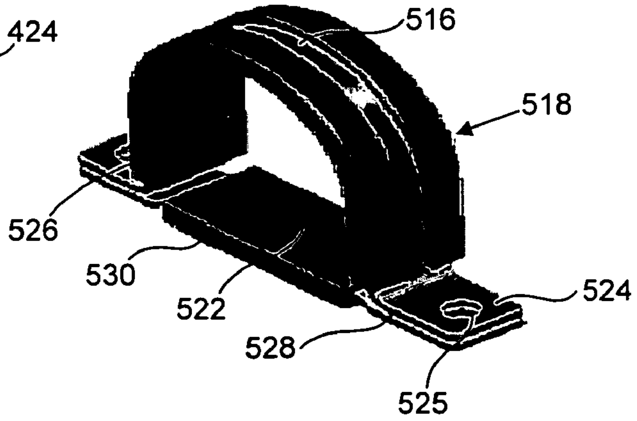

FIGS. 4*a* and 4*b* are similar to FIGS. 3*a* and 3*b* except that cushions 418 and 518 are fabricated from a conductive material. In one such embodiment, an embedded thin wire 422, 522 is disposed within cushions 418 and 518, and possibly also within base cushion 530. Preferably, the embedded thin wire 422, 522 has a portion thereof exposed to the interior surface 426, 526. However, alternatively, the embedded thin wire 422, 522 may be exposed just below the interior surface such that upon compression of cushion 418, 518, and 530, by the tube or duct being held, electrical contact is created there-between.

In the clamp embodiments with the metallic stitching, the embedded thin wire, and the metal impregnated conductive cushion material, assembly of the clamp is quite easy as no additional electrical connections or bonding needs to be made. The cushion is simply formed with the conductive material therein and is then secured to the respective strap. Such metallic stitching, embedded thin wire, or conductive cushion material not only will bear contact against the tube being held, but will also contact, in the preferred embodiment, the strap, which is metallic. Thus, use of the clamp assembly assures proper grounding of conductive items. This way, numerous grounding clamps, bolts, nuts, washers, grounding jumpers, and other parts are eliminated in a particular application, such as an aircraft. This reduction in part count reduces the risk of mistakes, speeds assembly times, and thereby reduces costs. Eliminating this loose hardware also reduces the potential of foreign object damage (FOD) resulting from dropping loose hardware during assembly, or disassembly during maintenance. Shop workers have expressed this due to the difficult access often associated where the grounding jumpers are located. Dropping hardware in a busy bay can sometimes result in hours of searching for all of the small parts.

Figure 5:
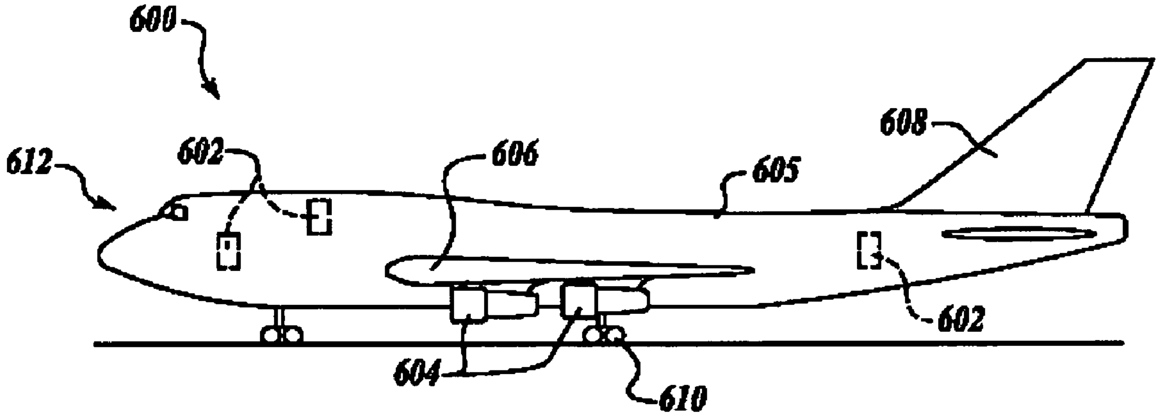
FIG. 5 is a side elevational view of an aircraft 600 in accordance with another alternate embodiment of the present invention.

It will be appreciated that a wide variety of apparatus may be conceived that include clamping apparatus in accordance with alternate embodiments of the present invention, and that the invention is not limited to the particular embodiments described above and shown in FIGS. 1-4*b*. For example, FIG. 5 is a side elevational view of an aircraft 600 having one or more clamping apparatus 602 formed in accordance with alternate embodiments of the present invention. In general, except for the clamping apparatus 602 formed in accordance with the present invention, the various components and subsystems of the aircraft 600 may be of known construction and, for the sake of brevity, will not be described in detail herein. Embodiments of clamping apparatus 602 in accordance with the present invention, including but not limited to those embodiments described above and shown in FIGS. 1-4*b*, may be employed in a wide variety of systems and subsystems within the aircraft 600.

More specifically, as shown in FIG. 5, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. A plurality of clamping apparatus 602 formed in accordance with the present invention are employed in a variety of subsystems located within the fuselage 605 and distributed throughout the various portions of the aircraft 600, including, for example, subsystems for handling and distributing electrical power, oxygen, fuel, hydraulic fluids, and air.

Although the aircraft 600 shown in FIG. 5 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of apparatus and methods in accordance with the present invention may be utilized in the other applications, including, for example, ships, buses, trains, recreational vehicles, subways, monorails, or any other desired applications.

While various preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined by reference to the claims that follow.

What is claimed is:

1. A clamp for holding an item to an electrically conductive structure, the clamp comprising:

a strap having structural strength and being configured to receive and hold the item, said strap being electrically conductive and having an inner surface proximate the item and an outer surface opposite the inner surface;

a fastener operatively coupled to said strap and configured to secure said strap to the structure;

a cushion disposed over at least a portion of said strap, said cushion having a first portion disposed on the inner surface of the strap and at least one wing member extending laterally outwardly from the first portion around a lateral edge of the strap and covering at least a portion of the outer surface of the strap, the cushion being configured to at least partially isolate the item from shock and vibration transmitted through said strap; and a conductive material coupled to at least at a portion of an inner surface of said cushion and configured to be positionable proximate the item, said conductive material being electrically coupled to said strap.

2. The clamp of claim 1, wherein said strap comprises an electrically conductive material.

3. The clamp of claim 2, wherein said strap is constructed with metal.

4. The clamp of claim 3, wherein said cushion includes rubber.

5. The clamp of claim 1, wherein said cushion includes an interior surface and wherein said conductive material comprises a metallic strip coupled to said interior surface of said cushion.

6. The clamp of claim 5, wherein said strap includes a securement portion configured to receive said fastener, said metallic strip being electrically coupled to said strap.

7. The clamp of claim 1, wherein said cushion includes an interior surface and wherein said conductive material comprises metallic stitching within said cushion, at least a portion of said stitching being exposed to the interior surface of said cushion.

8. The clamp of claim 1, wherein said conductive material comprises a metal impregnated cushion.

9. The clamp of claim 8, wherein said cushion comprises rubber.

10. The clamp of claim 1, wherein said strap is formed into a "P" shape.

11. The clamp of claim 1, wherein said strap includes two parts coupled together to encircle the item.

12. The clamp of claim 11, wherein said strap is formed into a "D" shape.

13. The clamp of claim 12, wherein said cushion is secured to said two parts.

14. A method of securing an item to an electrically conductive structure, comprising:

coupling a conductive material to a cushioning material;

securing the cushioning material to an elongate strap having an inner surface proximate the item and an outer surface opposite from the inner surface, at least a portion of the strap being conductive, the conductive material being coupled to the conductive portion of the strap, the cushioning material having a first portion disposed on the inner surface of the strap and at least one wing member extending laterally outwardly from the first portion around a lateral edge of the strap and covering at least a portion of the outer surface of the strap;

at least partially encircling the item to be secured by the elongate strap, the cushioning material being placed between the elongate strap and the item, the conductive material contacting the item; and fastening the elongate strap to the structure with a fastener, the conductive portion of the strap contacting the conductive structure.

15. The method of claim 14, wherein coupling a conductive material to a cushioning material comprises securing a metallic strip to an inner surface of the cushioning material.

16. The method of claim 14, wherein coupling a conductive material to a cushioning material comprises stitching a metallic material into the cushioning material.

17. The method of claim 14, wherein coupling a conductive material to a cushioning material comprises embedding a thin wire into the cushioning material.

18. The method of claim 14, wherein coupling a conductive material to a cushioning material comprises metal impregnating a cushioning material.

19. The method of claim 14, wherein the elongate strap forms a clamp.

20. The method of claim 19, wherein the clamp is formed from a metallic band.

21. The method of claim 20, wherein the conductive material contacts the metal band.

* * * * *